United States Patent [19]
Shing

[11] Patent Number: 5,531,006
[45] Date of Patent: Jul. 2, 1996

[54] MACHINE FOR TAPERING PIPE ENDS WITH DIFFERENT DIAMETERS

[76] Inventor: Lee T. Shing, P.O. Box 82-144, Taipei, Taiwan

[21] Appl. No.: 359,409

[22] Filed: Dec. 20, 1994

[51] Int. Cl.⁶ .............................. B23P 19/00; B23B 5/16; B23Q 3/06
[52] U.S. Cl. .............................. 29/33 T; 82/131; 269/902; 408/107
[58] Field of Search .................................. 29/33 T, 56.6, 29/33 R; 408/104, 105, 106, 107; 82/113, 173, 131; 269/900, 902, 140, 146

[56] References Cited

U.S. PATENT DOCUMENTS

| | | | |
|---|---|---|---|
| 2,242,487 | 5/1941 | Swanson | 408/107 |
| 4,425,062 | 1/1984 | Kanamura et al. | 29/33 T |
| 4,667,548 | 5/1987 | Astle et al. | 269/902 |
| 4,674,163 | 6/1987 | Nugier | 29/33 T |
| 4,813,114 | 3/1989 | Walker | 29/33 |

FOREIGN PATENT DOCUMENTS

| | | | |
|---|---|---|---|
| 212081 | 3/1987 | European Pat. Off. | 82/113 |
| 67001 | 4/1985 | Japan | 82/113 |
| 1034843 | 8/1983 | U.S.S.R. | 29/33 T |
| 1808268 | 4/1993 | U.S.S.R. | 82/113 |

*Primary Examiner*—William Briggs
*Attorney, Agent, or Firm*—Alfred Lei

[57] ABSTRACT

A machine for tapering pipe ends with different diameters including a feeding conveyor, a platform, a gripping mechanism mounted at one side of the feeding conveyor and mounted on the platform, the gripping mechanism including a frame provided with two vertical racks, a horizontal rack between lower ends of the vertical racks, an upper clamp slidably mounted on an upper portion of the two vertical racks, a lower clamp slidably mounted on a lower portion of the two vertical racks, a first hydraulic cylinder installed on a top of the frame and drivingly connected with the upper clamp, a second hydraulic cylinder mounted on one vertical side of the frame and drivingly connected with a lower sliding wedge, an upper sliding wedge arranged on the lower sliding wedge, an axle mounted on a rear side of the frame and connected with an arm, a third hydraulic cylinder mounted on the platform and connected with an end of the arm, another end of the arm being connected with a triggering rod ad a sensor, and a head stock mounted on the platform and having a head installed on a U-shaped seat controlled by a fourth hydraulic cylinder and a fifth hydraulic cylinder drivingly connected with the U-shaped seat.

3 Claims, 8 Drawing Sheets

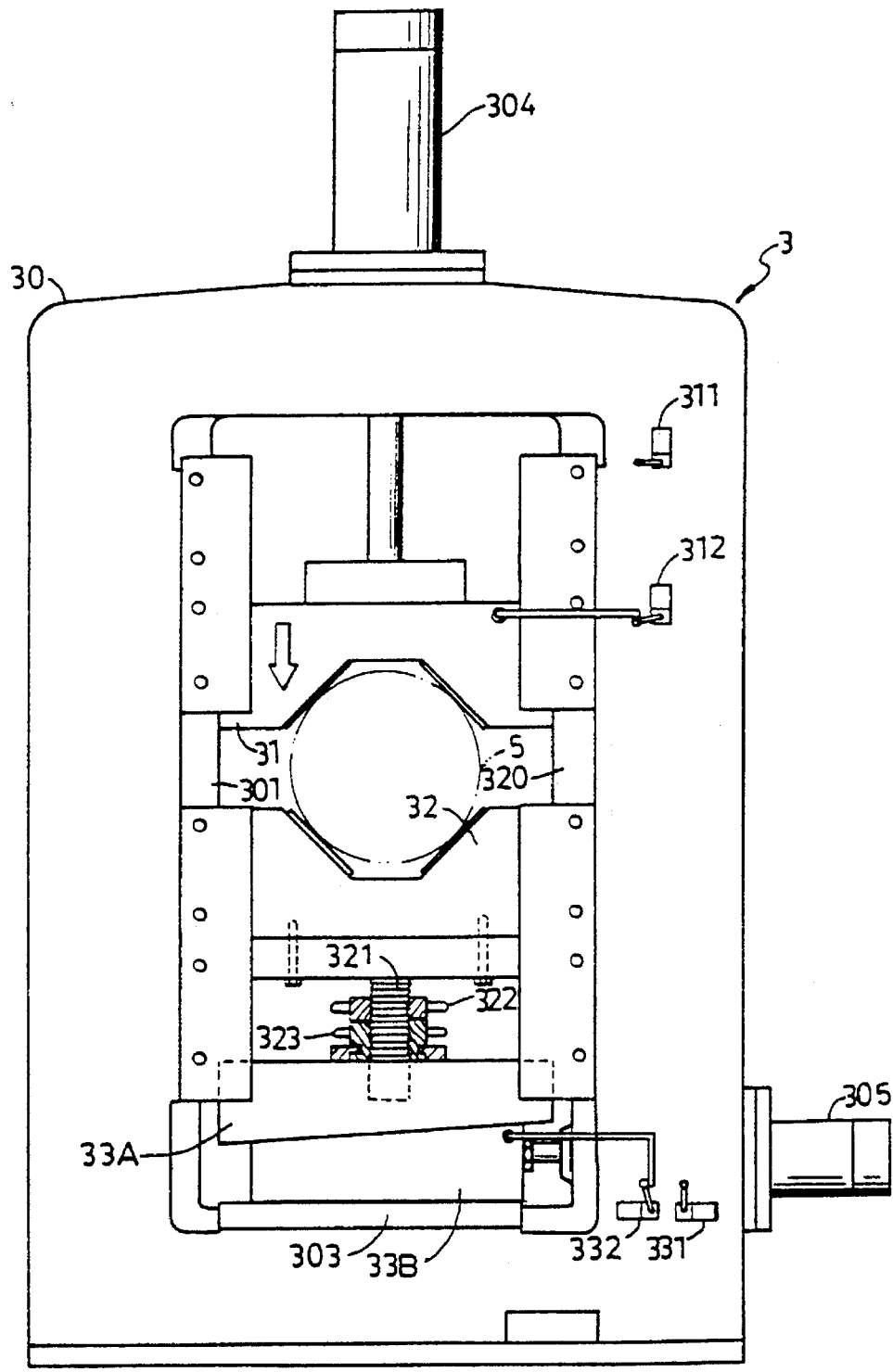
F I G. 7

5,531,006

MACHINE FOR TAPERING PIPE ENDS WITH DIFFERENT DIAMETERS

BACKGROUND OF THE INVENTION

It has been found that the conventional machine for tapering pipe ends (see FIGS. 1 and 2) generally includes a feeding mechanism A, a gripping mechanism B, and a head stock C. The head stock C is stationary, while the feeding mechanism A is adjustable and utilizes a hydraulic cylinder A1 to regulate the position of a conveyor belt A2. Nevertheless, after the machine has been used for a certain period of time, it will be difficult for the conveyor belt A2 to keep at a horizontal position thereby increasing the error in working. The gripping mechanism B utilizes two hydraulic cylinders B3 and B4 to control two clamps B1 and B2. However, the pipe D will not be able to keep at a desired position once the hydraulic cylinders B3 and B4 has something wrong about their strokes.

Therefore, it is an object of the present invention to provide an improved machine for tapering pipe ends with different diameters which can obviate and mitigate the above-mentioned drawbacks.

SUMMARY OF THE INVENTION

This invention relates to a machine for tapering pipe ends with different diameters.

It is the primary object of the present invention to provide a machine for tapering pipe ends which can be adapted for use with pipes with different diameters.

It is another object of the present invention to provide a machine for tapering pipe ends with different diameters which can accurately form taper on a pipe.

It is still another object of the present invention to provide a machine for tapering pipe ends with different diameters which is easy to operate.

It is still another object of the present invention to provide a machine for tapering pipe ends with different diameters which is simple in construction.

It is a further object of the present invention to provide a machine for tapering pipe ends with different diameters which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 7 shows the working principle of the gripping mechanism shown in FIG. 4;

DETAILED DESCRIPTION OF THE PREFERRED EMBODIMENT

Figure 1:
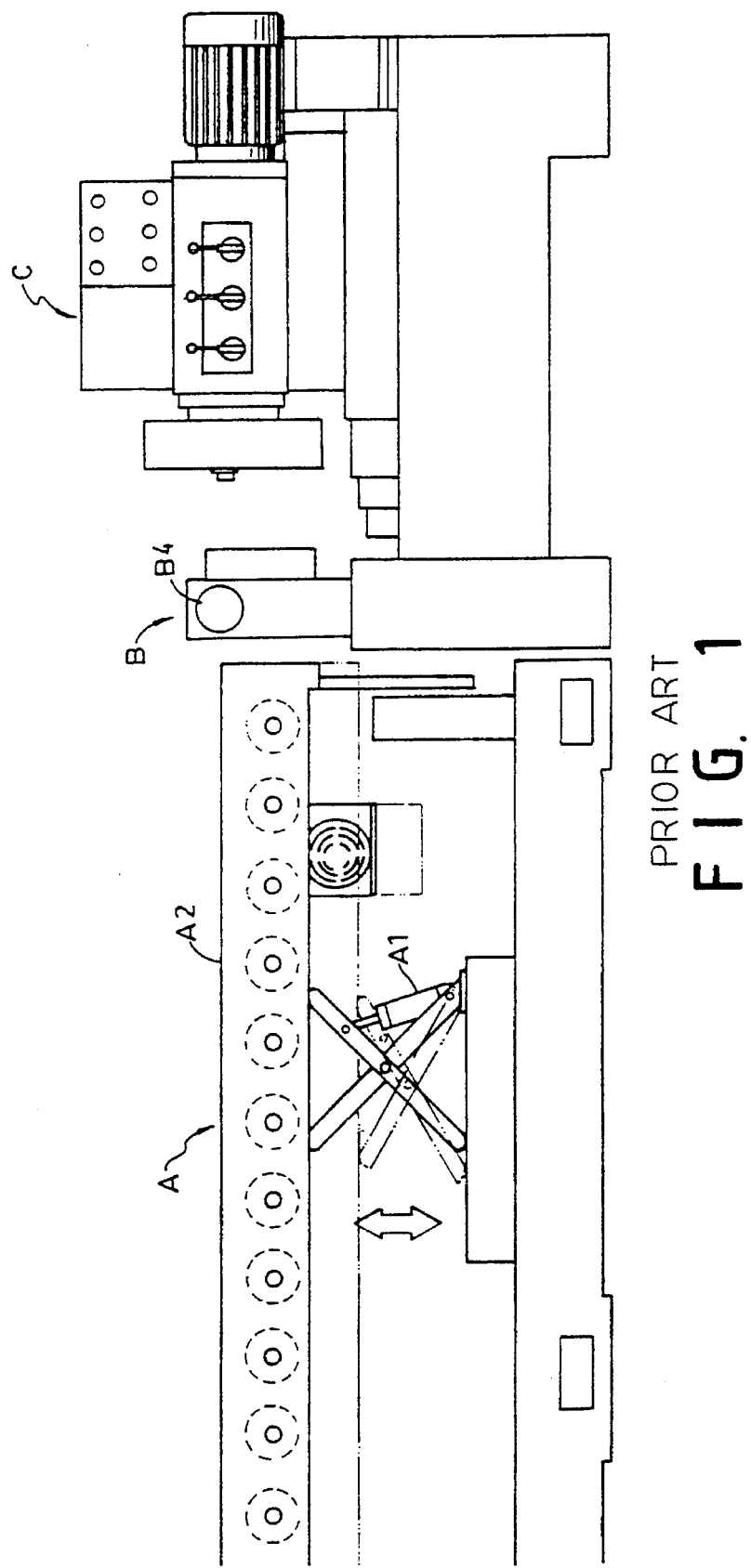
FIG. 1 is a side view of a prior art machine for tapering pipe ends.
Figure 2:
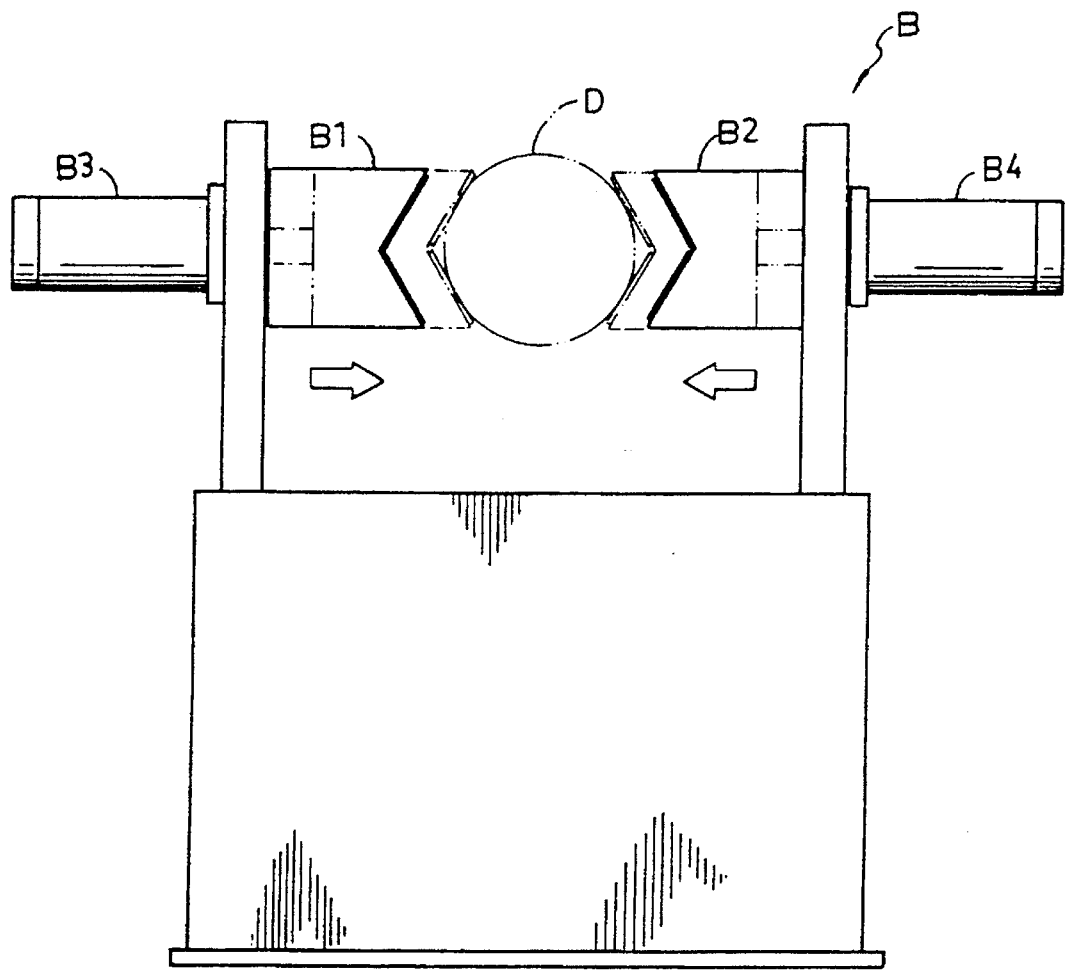
FIG. 2 is a front view of the gripping mechanism of the prior art machine.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 3:
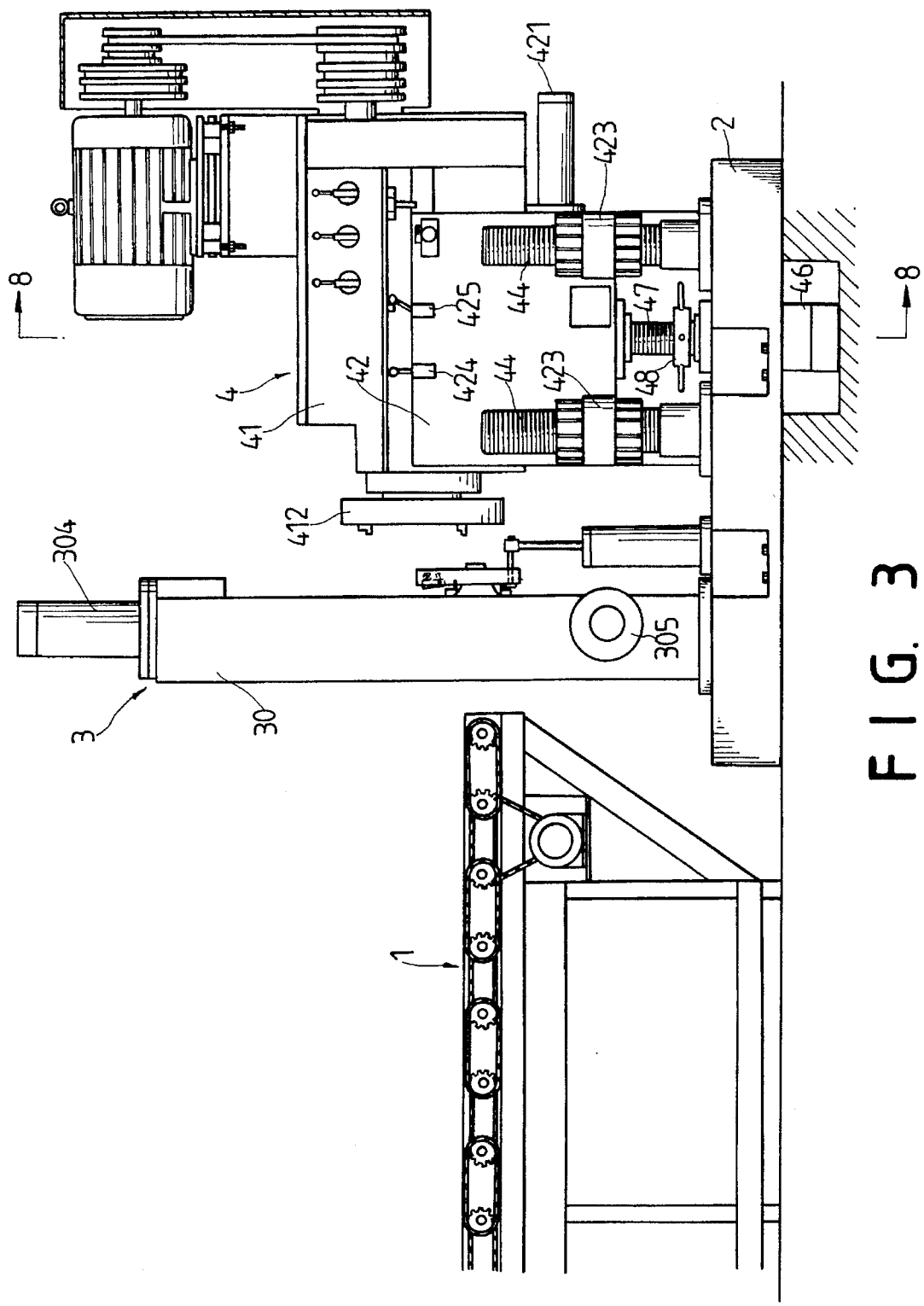
FIG. 3 is a side view of the present invention.

With reference to the drawings and in particular to FIG. 3 thereof, the present invention mainly comprises a feeding conveyor 1, a platform 2, a gripping mechanism 3, and a head stock 4.

As shown in FIG. 3, the feeding conveyor 1 may be any conventional design well known to those skilled in the art and is not considered as a part of the invention.

The platform 2 (see FIG. 3) is designed for supporting the gripping mechanism 3 and the head stock 4.

Figure 4:
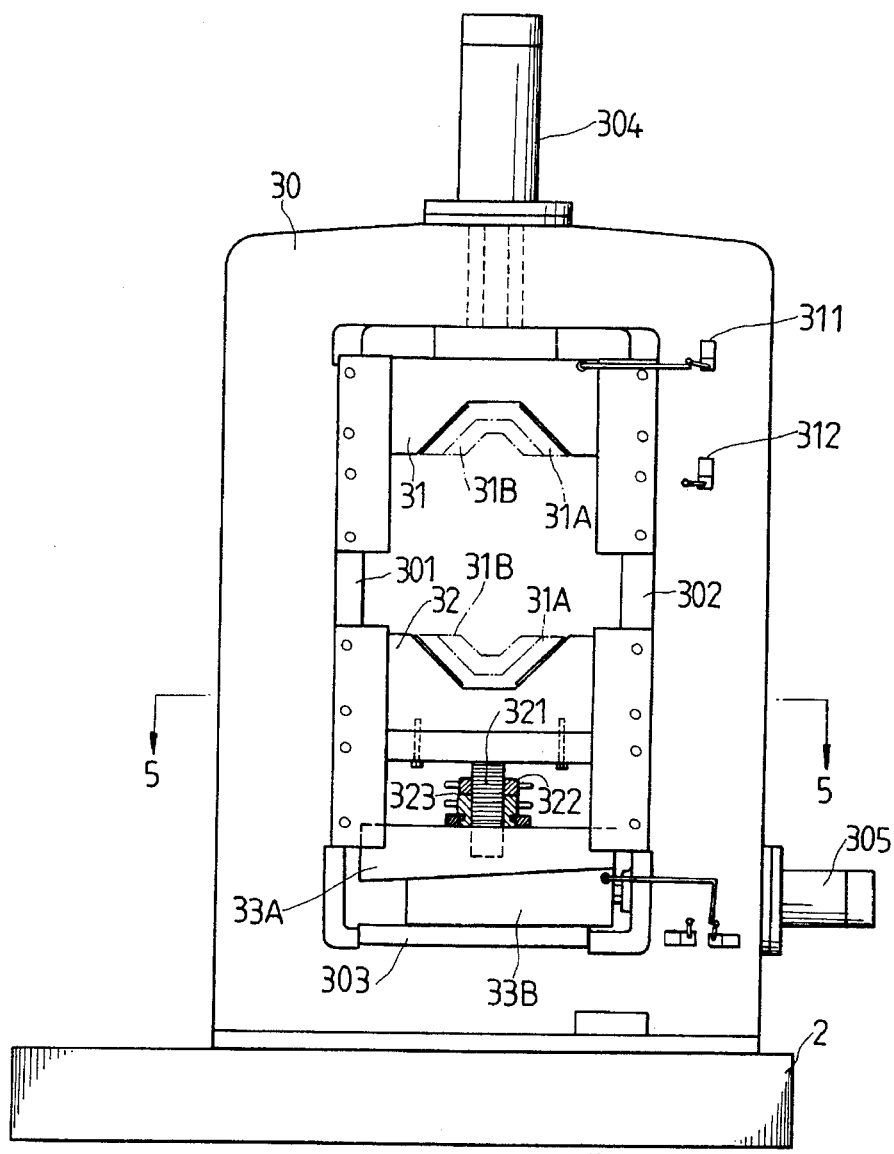
FIG. 4 is a front view of the gripping mechanism according to the present invention.
Figure 5:
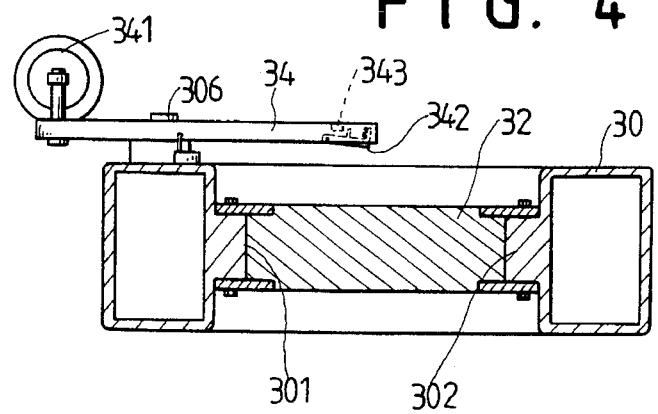
FIG. 5 is a sectional view taken along line 5—5 of FIG. 4.
Figure 6:
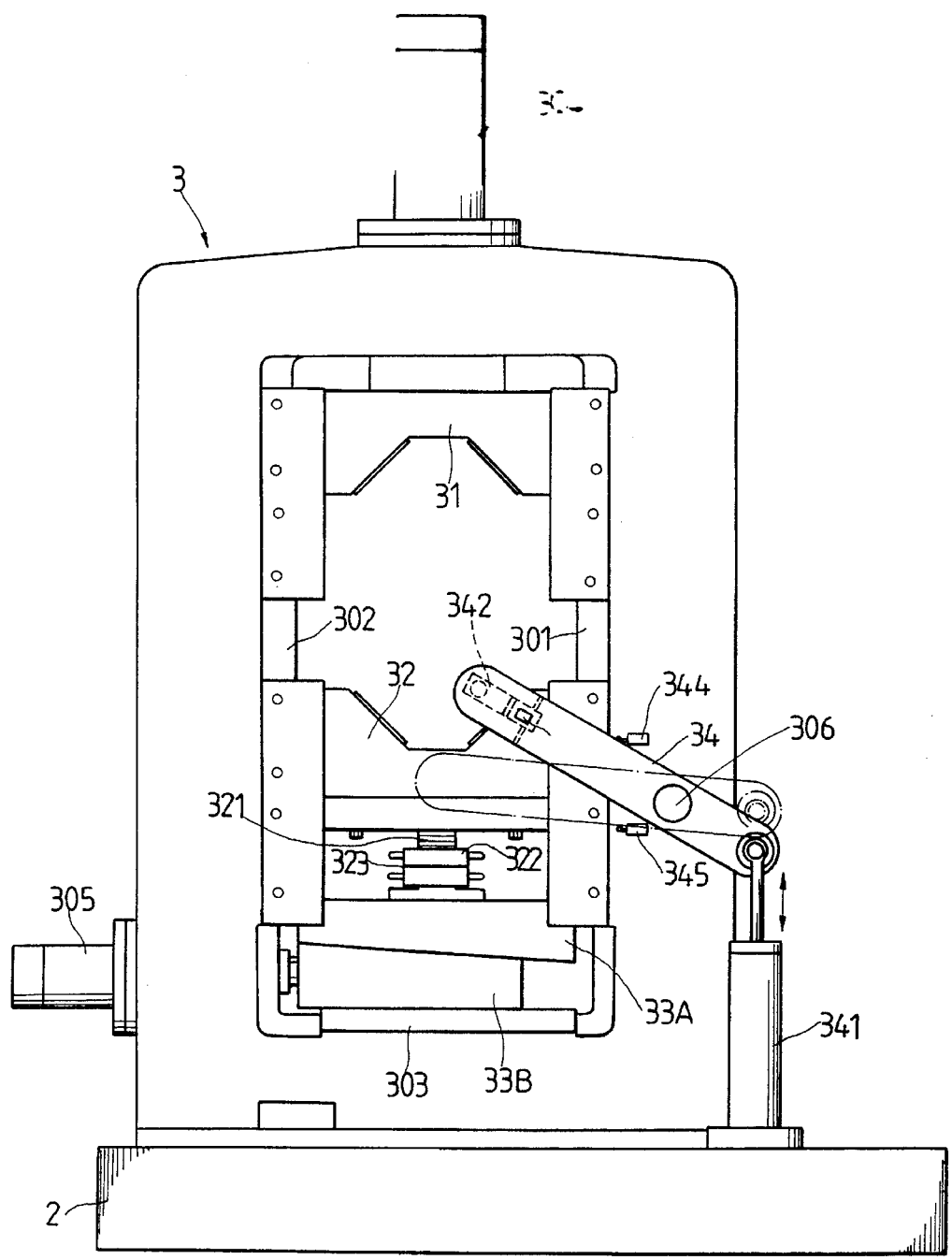
FIG. 6 is a rear view of the gripping mechanism according to the present invention.
Figure 8:
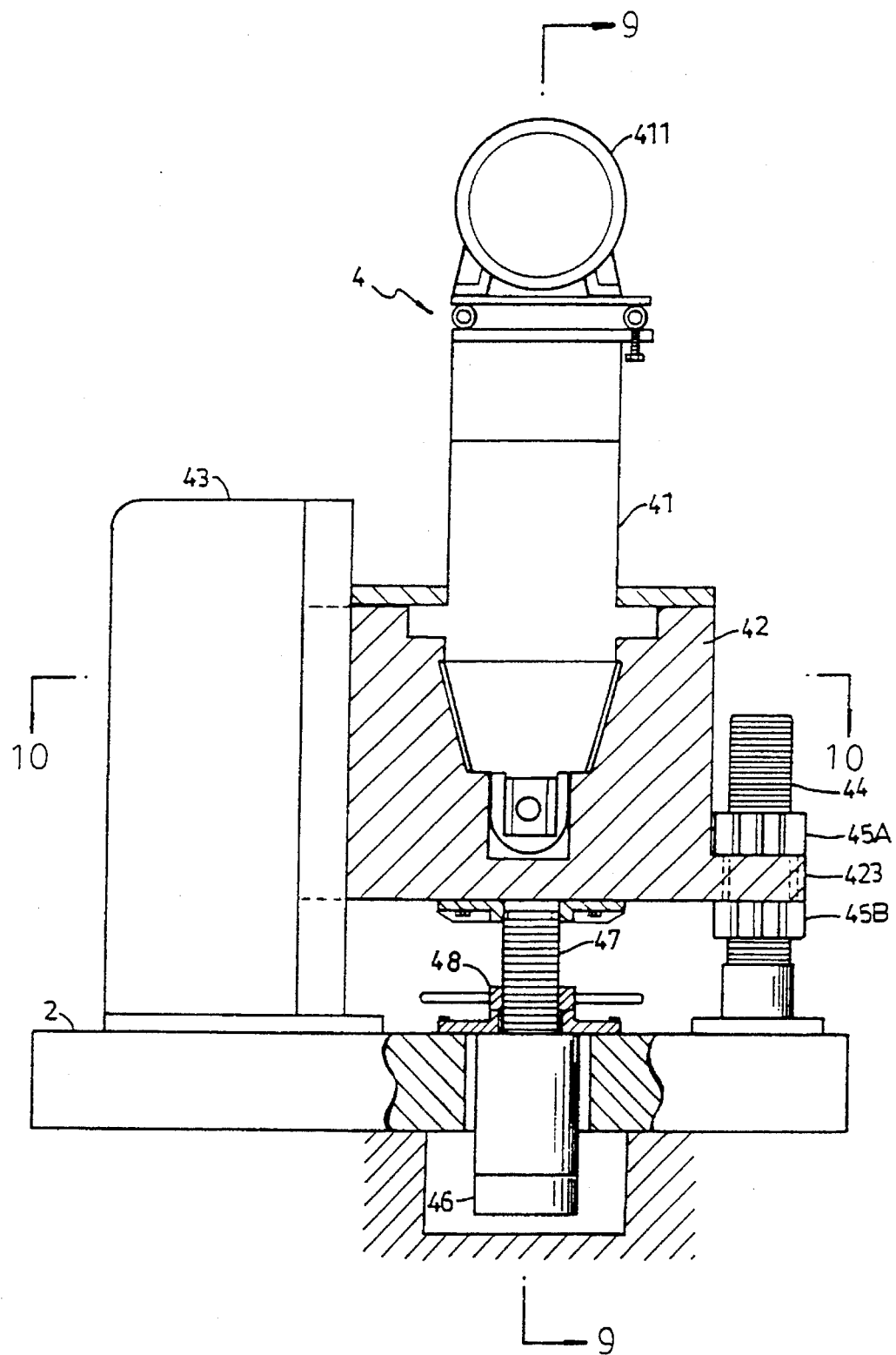
FIG. 8 is a sectional view taken along line 8—8 of FIG. 3.
Figure 9:
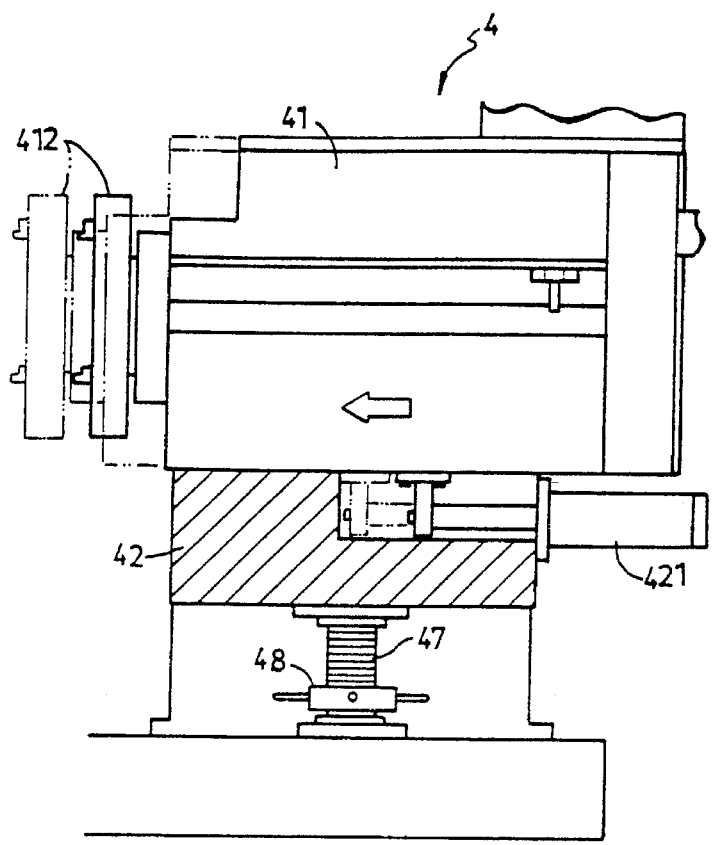
FIG. 9 is a sectional view taken along line 9—9 of FIG. 8.
Figure 10:
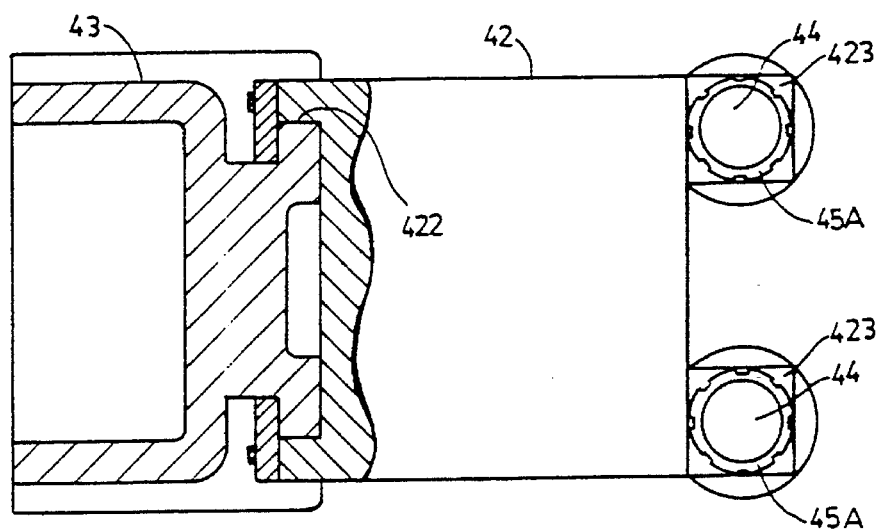
FIG. 10 is a sectional view taken along line 10—10 of FIG. 8.

The gripping mechanism 3 (see FIGS. 4, 5 and 6) is mounted at one side of the feeding conveyor 1 and includes a frame 30. The frame 30 is provided with two vertical racks 301 and 302 and a horizontal rack 303 between the lower ends of the two vertical racks 301 and 302. Within the frame are fitted an upper clamp 31, a lower clamp 32, an upper sliding wedge 33A and a lower sliding wedge 33B. The upper clamp 31 and the lower clamp 32 are slidably mounted on the upper portion and lower portion of the racks 301 and 302. The lower sliding wedge 33B is slidably arranged on the rack 303. A first hydraulic cylinder 304 is installed on the top of the frame 30 and drivingly connected with the upper clamp 31. The stroke of the upper clamp 31 is controlled by two micro-switches 311 and 312. A second hydraulic cylinder 305 is mounted on one vertical side of the frame 30 and drivingly connected with the lower sliding wedge 33B. The stroke of the lower sliding wedge 33B is controlled by two micro-switches 332 and 331. On the rear side of the frame 30 is mounted an axle 306 connected with an arm 34 (see FIGS. 5 and 6). A third hydraulic cylinder 341 is mounted on the platform 2 and connected with an end of the arm 34. The other end of the arm 306 is connected with a triggering rod 342 and a sensor 343. The stroke of the arm 34 is limited by the micro-switches 344 and 345. Between the lower clamp 32 and the upper sliding wedge 33A there are an adjusting bolt 321, a locking nut 322 and an adjusting nut 323 for regulating the position of the lower clamp 32. Smaller clamping members 31A, 31B, 32A and 32B are provided for the upper clamp 31 and the lower clamp 32 in order to adapt to pipes 5 with different diameters.

As shown in FIGS. 3, 8, 9 and 10, the head stock 4 is also mounted on the platform 2 and includes a motor 411. The motor 411 is drivingly connected with a chuck 412 through a head 41. The head 41 is installed on a U-shaped seat 42 which can be pushed to move forward and backward by a fourth cylinder 421. The stroke of the U-shaped seat 42 is limited by two micro-switches 424 and 425. The U-shaped seat 42 is formed with a notch 422 engaged with a rack seat 43 and a pair of lugs 423 at the rear side. The U-shaped seat 42 is fixedly mounted on the platform 2 by extending bolts 44 through the lugs 423 to engage with nuts 45A and 45B. A fifth hydraulic cylinder 46 is arranged on the platform 2 and connected with a screw 47 and a nut 48. When the nuts 45A and 45B are loosened, the fifth hydraulic cylinder 46 can move the U-shaped seat 42 together with the head 41 to go up and down along the rack seat 43 thereby adapting to pipes with different sizes. Further, the nut 48 and the screw 47 are used to keep the U-shaped seat 42 at a fixed position.

When in use, first adjust the bolt 321 to regulate the position of the lower clamp 32 so as to adapt to the pipe to be processed and use the hydraulic cylinder 46 to adjust the position of the head 41 and the chuck 412. Then, the hydraulic cylinder 305 is actuated to pull the lower sliding wedge 33B to go forward so that the upper sliding wedge 33A is slightly lowered in position thereby slightly moving the lower clamp 32 downward and therefore enabling the pipe 5 even with blurred edge to be arranged on the lower clamp 32. As the pipe 5 is transmitted by the feeding conveyor 1 to contact the triggering rod 342 of the arm 34. Thereafter, the sensor 343 emits a signal to stop the feeding conveyor 1 and actuates the hydraulic cylinder 305 to move the lower clamp 35 upward so as to contact the lower side of the pipe 5. In the meantime, the hydraulic cylinder 341 causes the arm 34 to rotate downward. Then, the hydraulic cylinder 304 drives the upper clamp 31 to contact the upper side of the pipe 5 (see FIG. 7). Thereafter, the motor 411 drives the chuck 412 to rotate at high speed and the hydraulic cylinder 421 pushes the head 41 together with the chuck 412 fitted with a cutting tool (not shown) to taper the pipe. Then, the hydraulic cylinder 421 drives the head 41 to move backward, the hydraulic cylinder 304 moves the upper clamp 31 upward, the hydraulic cylinder 305 drives the lower clamp 32 to go downward, and the feeding conveyor 1 moves the pipe 5 backward.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A machine for tapering pipe ends comprising:

a feeding conveyor;

a platform;

a gripping mechanism mounted at one side of said feeding conveyor and mounted on said platform, said gripping mechanism including a frame provided with two vertical racks, a horizontal rack between lower ends of the vertical racks, an upper clamp slidably mounted on an upper portion of the two vertical racks, a lower clamp slidably mounted on a lower portion of the two vertical racks, a first hydraulic cylinder installed on a top of the frame and drivingly connected with the upper clamp, a second hydraulic cylinder mounted on one vertical side of the frame and drivingly connected with a lower sliding wedge, an upper sliding wedge arranged on the lower sliding wedge, an axle mounted on a rear side of the frame and connected with an arm, a third hydraulic cylinder mounted on said platform and connected with an end of the arm, another end of the arm being connected with a triggering rod and a sensor; and a head stock mounted on said platform and having a head installed on a U-shaped seat controlled by a fourth hydraulic cylinder and a fifth hydraulic cylinder drivingly connected with the U-shaped seat.

2. The machine for tapering pipe ends as claimed in claim 1, wherein said gripping mechanism utilizes an adjusting bolt, a locking nut and an adjusting nut for regulating position of said lower clamp.

3. The machine for tapering pipe ends as claimed in claim 1, further comprising a screw and a nut for keeping said U-shaped seat at a fixed position.

\* \* \* \* \*